United States Patent [19]

Brauer et al.

[11] 4,314,692
[45] Feb. 9, 1982

[54] ELECTRIC MOTOR-DRIVEN ROPE PULL HOIST FOR MOTOR VEHICLE DOORS

[75] Inventors: Gerhard Brauer, Oberbiel; Peter Adam, Höchberg; Werner Seuffert, Bergrheinfeld, all of Fed. Rep. of Germany

[73] Assignees: Küster & Co. GmbH, Ehringhausen; Siemens Aktiengesellschaft, Munich, both of Fed. Rep. of Germany

[21] Appl. No.: 72,311

[22] Filed: Sep. 4, 1979

[30] Foreign Application Priority Data

Sep. 5, 1978 [DE] Fed. Rep. of Germany ....... 2838678

[51] Int. Cl.³ .................... B66D 1/12; E05F 11/48
[52] U.S. Cl. .................................... 254/362; 49/139; 49/349; 49/352; 310/83
[58] Field of Search ............... 254/362; 49/118, 123, 49/139, 140, 280, 332, 334, 337, 349, 352; 310/83, 154, 155

[56] References Cited

U.S. PATENT DOCUMENTS

| | | | |
|---|---|---|---|
| 2,696,579 | 12/1954 | VanDerVeer | 49/139 X |
| 3,203,690 | 8/1965 | Werner | 49/140 X |
| 3,444,402 | 5/1969 | Cartier | 310/154 X |
| 3,463,951 | 8/1969 | Bauerle et al. | 310/83 X |
| 3,469,128 | 9/1969 | Cartier | 49/349 X |
| 3,890,743 | 6/1975 | Eckhardt et al. | 49/352 |
| 4,085,629 | 4/1978 | Fogarollo | 49/139 |

FOREIGN PATENT DOCUMENTS 2803807  8/1979  Fed. Rep. of Germany ........ 49/352

Primary Examiner—John M. Jillions
Attorney, Agent, or Firm—Kenyon & Kenyon

[57] ABSTRACT

A motor vehicle hoist has a closed rope loop which is driven by a permanent magnet electric motor having a flat housing and a worm with a worm wheel. The worm is fastened to an end of the motor shaft which extends into an adjacent gear box, and turns a rope drum. The motor stator includes an axially oriented, magnetically nonconductive frame, which holds the rotor and at least one permanent magnet and which supports housing halves which serve, on both sides, as pole pieces. The worm wheel and rope drum are rotatably mounted on a common axis in the gear box. The motor is useful for opening windows, doors, and sliding roofs of vehicles.

22 Claims, 10 Drawing Figures

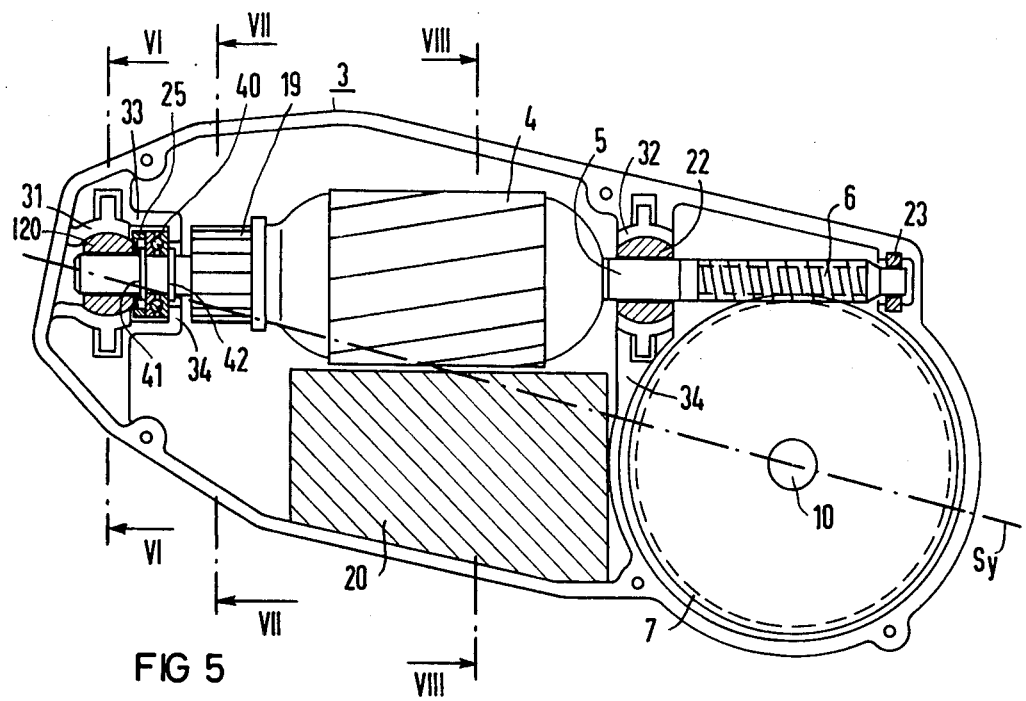
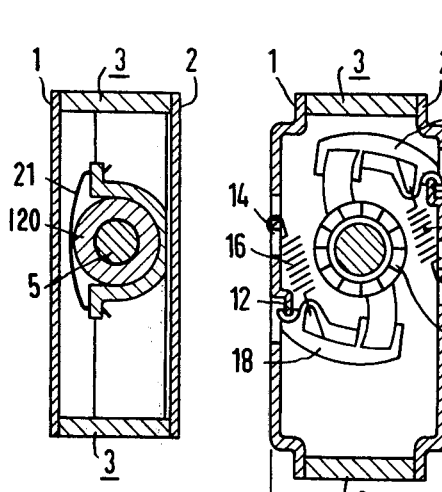
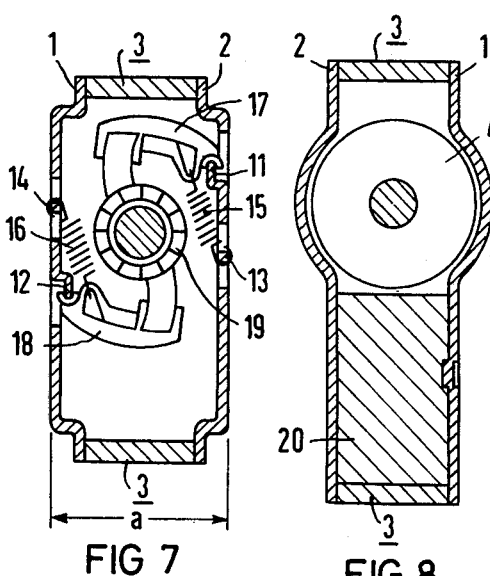
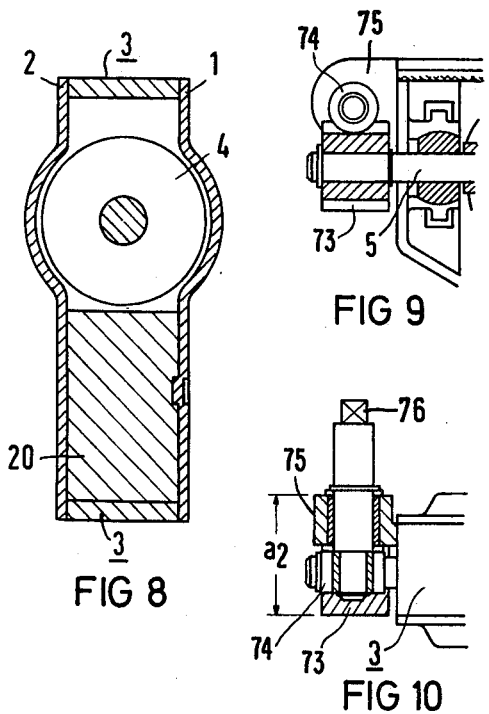

ELECTRIC MOTOR-DRIVEN ROPE PULL HOIST FOR MOTOR VEHICLE DOORS

BACKGROUND OF THE INVENTION

1. Field of the Invention

This invention relates to an electric motor-driven rope pull hoist, useful for operating motor vehicle windows, doors, sliding roofs and the like. More particularly, the hoist has a closed rope loop which is driven by a rope drum. A permanent magnet electric motor having a flat housing and a motor shaft end which extends into an adjacent gear box and, active through a worm, turns a worm wheel connected to the rope drum.

2. Description of the Prior Art

The use of motor-driven rope pull window raisers in motor vehicles for transmitting power from the driven shaft of an electric motor to a worm wheel, via a worm, is described in German Auslegeschrift No. 17 08 310. The worm and worm wheel are housed in a gear box and the worm wheel shaft protrudes out of the gear box to form the axis of a crank bolt carrying a small gear which meshes with a large gear supporting the rope drum. In motor-driven window raisers according to the state of the art the motor is flange mounted laterally to this intermediate gear arrangement.

In one known drive motor for a window operating mechanism in motor vehicles, a permanent-magnet DC motor is disposed in a flat, tightly closed housing, and has subsequent gearing. The magnetic return path for the motor comprises a U-shaped crossbar having free leg ends with faces resting against one side of an additional return path lamination. The other side of the lamination is adjoined by a cast aluminum gear box. The motor part of the drive is sealed by a thermoplastic cover over the return path crossbar and the outer edge of the return path lamination. The motor shaft, which extends through an opening in the return path lamination into the gear box and is provided there with a worm wheel, is mounted in sintered iron bearing cups which are fastened, on the one hand, to a bent yoke connecting the legs of the return path crossbar and, on the other hand, so as to rest directly against the gear box.

It is an object of the present invention to provide a rope pull hoist of great efficiency and, at the same time, great compactness, which can be made with simple production and assembly means.

SUMMARY OF THE INVENTION

According to the present invention, this problem is solved, for an electric motor-driven rope pull hoist of the kind mentioned at the outset, by means of a motor having a stator part which consists essentially of an axially oriented, magnetically nonconductive frame serving at least to mount or hold the rotor and at least one permanent magnet. The frame has pole pieces in close contact with it on both sides which also serve as the outside halves of the flat housing. The worm wheel and the rope drum turning with it are rotatably mounted on a common shaft in a gear box having approximately the same structural thickness as the flat electric motor.

In the structure of the invention, a strong magnetic force with a correspondingly great driven shaft moment is attained without increasing the overall depth of the permanent magnet-energized DC motor. A compact, flat, efficient drive system is achieved, which eliminates the need for a separate gearing arrangement between the worm and the rope drum by coupling the rope drum directly to the worm wheel on the common, fixed shaft. Substantial noise reduction is assured because essential components are mounted and held in the frame, independent of the housing halves which seal off the system from the outside. The housing halves can be assembled afterwards, simplifying production.

Such a rope pull hoist is particularly useful wherever the space available for the installation of a window raiser in motor vehicle doors, for example, is restricted by the filling of the free spaces between the door sidewalls with foam material to provide a safety zone which is as large as possible.

Another simplification, in the sense of a compact drive system, advantageously results from the magnetically nonconductive frame which integrates the motor and gears into one unit and in which the components of both the motor and the gears are retained or mounted. During assembly, the motor, gear, and shaft components are first assembled in the frame, with the shaft extending from the motor in its compartment to the worm and wheel in the adjacent gear box.

The entire, integrated drive unit is completed by tightly attaching the housing parts on both sides. The housing parts also serve as pole laminations. To prevent contamination of the motor parts in the integrated drive unit, for instance by lubricants used for the worm gears, a wall which separates the gear portion of the drive from the motor portion, is advantageously molded integrally to the single-piece frame. The magnetically nonconductive frame is susceptible to production in a particularly simple manner by designing it for single-piece, plastic, injection molding.

The compact design of the drive unit, consisting of electric motor, worm with worm gear, and rope drum coupled to the worm wheel, has the further advantage that only one permanent magnet is required. It is disposed in the space defined on two adjacent sides, by the motor rotor, on the one hand, and by the worm wheel and its connected rope drum, on the other hand, so that only the "dead angle" between the worm wheel and the motor rotor is utilized for the permanent magnet. A magnetic short circuit of the pole pieces at their ends away from the permanent magnet is prevented by the frame which is in direct contact with the pole pieces in this region.

According to another aspect of the invention, the gear box part which accommodates the worm, the worm wheel, and the concentrically coupled rope drum on a common, fixed shaft serves as a seat for the worm wheel and the rope drum and thus further compresses these components into a compact, integrated drive system along with mechanical means for limiting the angle of worm wheel rotation. It has been found that the greatest space savings may be achieved by putting the means for limiting the angle of rotation on the side of the worm wheel facing away from the rope drum and in the hollow provided in this side of the toothed rim of the worm wheel.

The driving connection between the worm wheel and the rope drum may be accomplished, for instance, by riveting them together or by making both components as one single part. However, to obtain smooth operation and gentle stopping at the end position, the worm wheel and the rope drum, as individual components, are advantageously brought into driving connection via resilient means. The resilient means may be, in particular, elastic buffers made of rubber or plastic.

Since the rope pull hoist of the invention requires no separate intermediate gearing means following the worm wheel, a further advantageous simplification and compactness results from fittings molded onto the gear box for fastening rope guiding tubes for the rope loop; such a design is particularly recommended whenever the gear box or the gear box halves, which contact the integrated frame, are produced as injection moldings.

In order to be able to adapt or change the angle at which the two parts of the rope loop approach and depart from the rope drum, thereby standardizing the motor driven rope pull hoist irrespective of vehicle door design and independent of individual vehicle model, it is provided, according to another feature of the invention, that the fittings for fastening the rope guiding tubes be designed as separate components which are attachable to the gear box at different angles relative to the rope drum.

BRIEF DESCRIPTION OF THE DRAWINGS

FIG. 5 is a longitudinal view, in partial cross section, of a second embodiment of a unitary drive, having an integrated frame with motor and gear components assembled therein;

FIG. 6 is a view, in cross section, of the drive unit of FIG. 5, taken along line VI—VI;

FIG. 7 is a view, in cross section, of the drive unit of FIG. 5, taken along line VII—VII;

FIG. 8 is a view, in cross section, of the drive unit of FIG. 5 taken along line VIII—VIII;

FIG. 9 is a view, in partial cross section, of the unitary drive of FIG. 2, showing the addition of a manual operating mechanism on the left face; and FIG. 10 is a view, in partial cross section, of the top of the the manual operating mechanism of FIG. 9.

DETAILED DESCRIPTION OF THE INVENTION

Figures 1, 2, 3, 4:
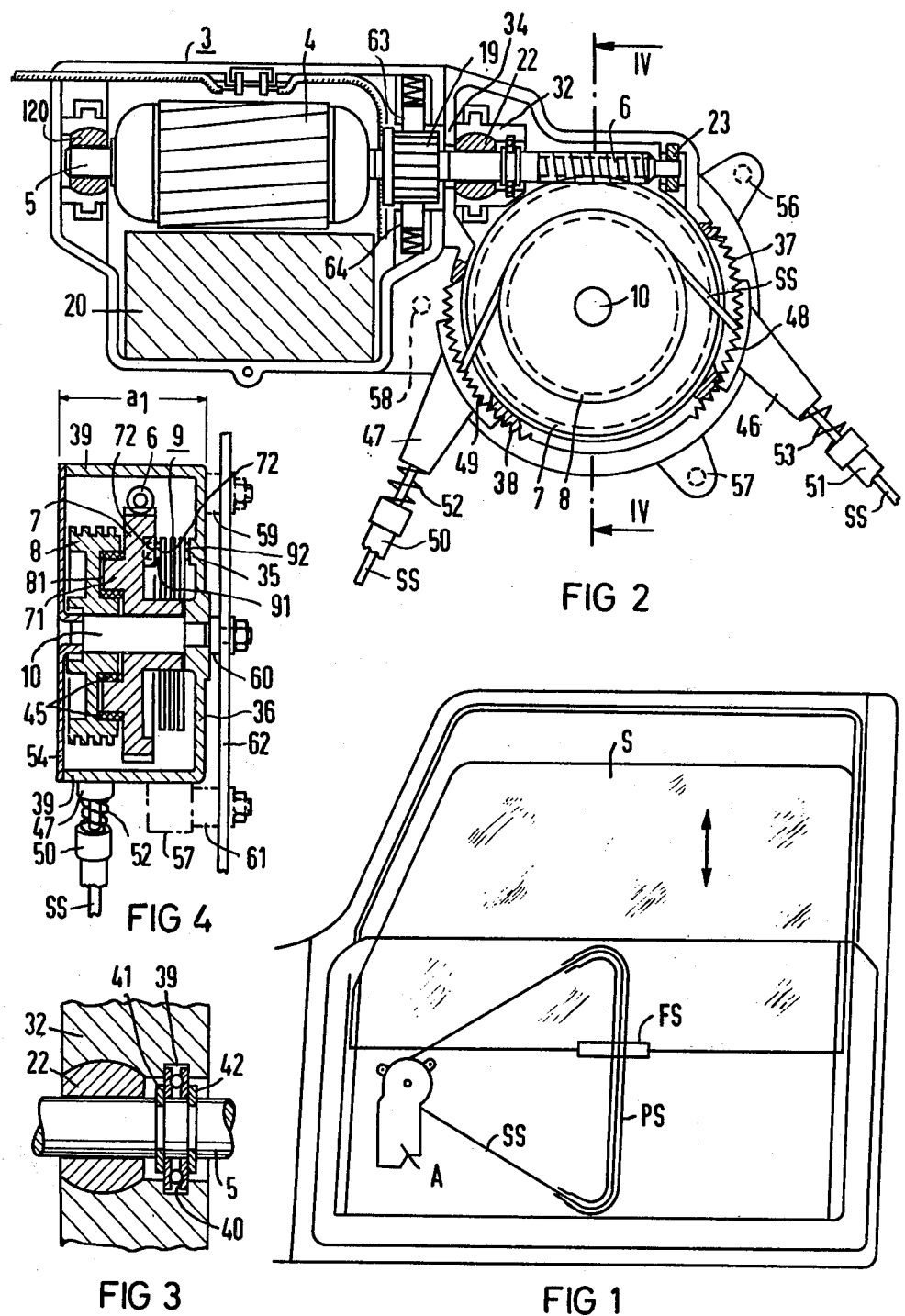
FIG. 1 is a side view of a window raiser, according to the teachings of the invention, installed in a motor vehicle door.
FIG. 2 is a longitudinal view, in partial cross section of one embodiment of a unitary motor and gear drive having an integral frame and showing the assembled motor gear, and rope drum components.
FIG. 3 is a view, in partial cross section, of the axial thrust bearing disposed between motor and worm gear in the drive unit of FIG. 2.
FIG. 4 is a view, in partial cross section, of the gear box of the drive unit of FIG. 2 taken along line IV—IV.

FIG. 1 shows the basic configuration of a rope pull hoist, fabricated according to the teachings of the invention, as applied to an electric motor driven window raiser installed inside a vehicle door. The compact drive unit A contains a flat permanent magnet DC motor, gearing, and a driven rope drum, integrated in the same housing. An endless rope loop SS is driven by the rope drum, via the turning electric motor and an interposed worm drive. In its right hand portion, rope loop SS is guided in a channel PS, and, depending on the direction of rotation of the rope drum, a guiding slide FS, to which the lower edge of the pane S of the vehicle door is fastened, is moved up or down along the straight part of channel PS. The entire electric motor driven window raiser is retained in the door in a manner not detailed, with drive unit A, on the one hand, and channel PS, on the other, being fastened to stationary supporting parts of the vehicle door.

As shown in the longitudinal views of FIGS. 2 and 5, an integrated unitary drive, according to the invention, includes a motor rotor 4 and a worm wheel 7, which are both mounted in a magnetically nonconductive frame 3, which can be an aluminum or zinc die casting or a plastic injection molding, and which extends, as an integrated component, forming a motor part and a gear part. A single permanent magnet 20 is disposed in the motor part space which is defined, towards the top, by motor rotor 4 and, towards the right, by worm wheel 7 in the gear part. Two housing halves, which can be separated from the frame 3 in planes lying parallel to the direction of the motor axis, are designed as pole pieces 1 and 2. The housing halves are placed on frame 3 so as to form a tightly sealed, flat housing which surrounds motor rotor 4. As may be best seen in FIG. 8, which illustrates the construction of the drive of FIG. 2, as well as that of FIG. 5, pole pieces 1 and 2 are in direct contact with permanent magnet 20 at one end. The pole pieces conform to the radius of rotor 4 in the region of the rotor, providing pole surfaces. Pole pieces 1 and 2 are fastened at their ends furthest away from permanent magnet 20 to magnetically nonconductive frame 3; in this way a magnetic short-circuit does not occur. Permanent magnet 20 requires no adaptive curvature to fit it to the rotor because it is magnetized perpendicular to the direction of the motor axis and is not itself a pole shoe. Shaft 5 of motor rotor 4 extends to the right, ending in a worm 6 which meshes with a worm wheel 7 rotatably mounted on a spindle 10. Spindle 10 is fastendd in the gear box part.

As may be seen in FIG. 4, a rope drum 8 is rotatably mounted on the fixed spindle 10, coaxial with, and to one side of, worm wheel 7; rope drum 8 is in driving connection with worm wheel 7. The driving connection between worm wheel 7 and rope drum 8 is provided by axially projecting pins 71 which are molded into the circumference of worm wheel 7 and which engage corresponding holes 81 in rope drum 8. To obtain smooth running, and, particularly, to assure gentle stopping in the end positions, pins 71 are covered by a rubber buffer before worm wheel 7 and rope drum 8 are assembled.

Several washers 9, are rotatably mounted on fixed shaft 10 on the side of worm wheel 7 which faces away from rope drum 8, and serve to mechanically limit the angle of rotation of worm wheel 7. The use of a washer stack 9 of this general nature has previously been suggested for use in limiting the angle of rotation for a worm wheel and rope drum, and, hence, as a device for limiting window travel, in German Patent Application No. P 27 48 877.3-23. To achieve this limitation of the rotation angle, worm wheel 7 is provided with a stop tab 72 which interacts with an outer stop tab 91 of washer stack 9. Frame 3, which is expanded to form a cuplike recess in the region of the worm drive has a housing wall 36, which carries a stop tab 35 for interacting with an outer stop tab 92 on the oppositely facing side of washer stack 9. The various washers of washer stack 9 are interconnected by additional stops, not shown here, each of which serves the purpose, after a rotation of almost 360°, of taking along the next adjacent washer.

As may also be seen in FIG. 4, the cup shaped housing having rear wall 36 and circular side wall 39 in integral frame 3, is closed by a separate gear box cover 54 which rests, on the motor side, tightly against adjacent pole piece 1. Attached to the periphery of sidewall 39 are two fittings 46 and 47 through which ends of rope loop SS are led before they are joined and which support the rope guiding tubes 50 and 51 for rope loop SS. Guide tubes 50 and 51 are mounted thereon with the inter-position of equalizing springs 52, 53 as described in German Patent Application No. P 26 16 331.5, the purpose of which is to keep rope loop SS taut. Fittings 46 and 47 and the gear box may be produced as one part or they may be separate.

In the present case, as shown in the illustrative embodiment of FIGS. 2 and 4, however, fittings 46 and 47 are designed as separate components which can be attached to sidewall 39 of gear box part 36, 39 at different angles, relative to rope drum 8. To accomplish this, the seating surfaces of fittings 46 and 47 advantageously conform to the curvature of wall 39 at its periphery in the intended attachment area, and wall 39 is provided, in a manner not detailed here, with appropriate breakthroughs to lead the rope loop SS out at the appropriate angle. To fix fittings 46, 47 in their angular positions on housing wall 39, the housing wall is provided with saw tooth notches 37 and 38 in which complementary saw tooth notches 48 and 49 of fittings 46 and 47, respectively, can engage and into which the latter can be pushed, in a locking system.

A particularly simple way of fastening the entire drive unit to a carrying part inside the vehicle door (FIG. 1) is provided by fastening lugs 56, 57 and 58, for fastening the motor and gear drive unit to a motor vehicle part 62 (FIG. 4), which are molded to the drive unit in the region of gear box part 36, 39. This sturdy fastening, which is thus attainable at low production cost, is made possible by integrally molding fastening lugs 56, 57 and 58 to rear wall 36 and/or sidewall 39 of frame 3 in the region of cupshaped gear box part 36, 39. The fastening lugs may also be integrally molded to gear box cover 54. In this case, it may be necessary to strengthen the cover in its function as load carrying component. However, this latter structure has the advantage that, when different attachment points for different vehicle door types are involved, an appropriate adaptation need only be made for the gear box cover, leaving the rest of the motor drive unit unchanged, as a universal component. To provide a noise-suppressing mounting, rubber buffers 59, 60 and 61 are advantageously inserted between the associated fastening lugs 56, 57 and 58 and the carrying motor vehicle part 62.

Shaft 5 of rotor 4 carries calottes 120 and 22 which are mounted, on either side of the rotor, in half-open bearing cups 31 and 32 which form integral parts of frame 3. By the insertion of calottes 120 and 22 in the half-open bearing cups, motor rotor 4 can be axially fixed during assembly. Radial fastening is accomplished, as may best be seen in FIG. 6, by means of a spring clip 21 which is clipped over half-open bearing cup 31 on frame 3. In the alternative, as in the case of calotte bearing 22 on the right in FIG. 2 near the worm drive, the half-open bearing cup may be screwed to the frame, carrying integrally cast-on bearing cup 32.

Absorption of axial thrusts acting upon motor rotor 4 is accomplished by providing, in addition to calotte bearings 22 which take up radial forces, an axial thrust bearing 40 (FIGS. 2 and 3) which is axially retained by retaining rings 41 and 42, engaged in grooves carried in shaft 5 on both sides of bearing 40. Thrust, acting in one or the other axial direction, is transmitted, in the retaining system of FIG. 3, by retaining rings 41 or 42, as appropriate, through axial thrust bearing 40 which is fitted into and held by annular groove 39 in frame 3. In the embodiment of FIG. 5, thrust is transmitted via a support plate 25 which bridges retaining ring 41, to calotte 120, and, via a shoulder 34 molded onto the half-open bearing cup, to integral frame 3.

As shown in FIG. 2, tubular brush holders 63 and 64, molded into frame 3 near integral partition wall 34 between the cavities of the motor part and the gear part and having a section conforming to the size of the brushes they are to hold, are provided to facilitate supply of current to motor commutator 19.

In the embodiment of FIG. 5, commutator 19 and its brush holders are located at the end of motor rotor 4 farthest away from the worm drive. In addition, and also differing from the embodiment of FIG. 2, the tubular brush holders are replaced by hammer-type brush holders for the supply of current to commutator 19. As may be seen, particularly in FIG. 7, tongues 11 and 12, stamped out of the respective pole plates 1 and 2, are bent inwardly to provide simple supports for hammer type brush holders 17 and 18. Thus, hammer-type brush holders 17 and 18 are suspended, with appropriate counterbearings, in the manner of knife-edges, on the ends of tongues 11 and 12; they are each urged against commutator 19 by a spring 15 or 16, respectively. Other integral tongues 13 and 14, likewise bent inwardly out of combination pole and housing plates 1 and 2, serve for hooks on which the opposite ends of spring 15 and 16 are fastened to the motor housing.

Both pole plates 1 and 2 and gear box cover 54 for cupshaped gear box part 36, 39 may be fastened tightly to frame 3 by means of screws. Sealing the openings left in pole plates 1 and 2 by bent-out tongues 11 to 14 can be accomplished simply, for example, by concluding the entire assembly operation with the external application of pressure-sensitive adhesive film, or of a sealing compound.

The combination motor and gear drive unit shown in FIG. 5 differs from that of FIG. 2 in still another way, in that, due to the assymmetrical shape of the single permanent magnet 20 of FIG. 5, a drive system is obtained which is symmetrical with respect to the illustrated axis of symmetry $S_y$, and is therefore useful for either right or left vehicle doors, without changes.

To provide, in case of a possible breakdown of the electrical system, for operation of the drive unit and, thus, for opening a vehicle window, a manual operating mechanism, such as a hand crank, can be connected directly or indirectly and from the outside, to one end of shaft 5 of motor rotor 4. For this purpose, one or the other end of shaft 5 is extended and shaped or slotted to receive an approximately shaped crank which can be applied directly or, via an intervening flexible shaft. In this way the motor shaft can then be turned by the crank to operate the rope pull without occurrence of a self-locking effect which can occur when an attempt is made to operate the mechanism in some other way.

A system to which the hand crank may be coupled is shown in FIGS. 9 and 10. There, the end of shaft 5 of motor rotor 4 farthest away from the gear box is led out of the motor housing through frame 3 and rigidly connected to a worm 73 which can be brought into driving connection with a worm gear 74 to which the handcrank can be coupled directly or indirectly. In the illustrative embodiment of FIGS. 9 and 10, worm 73 is attached to the end of extended shaft 5 and fastened to it. Worm gear 74, meshing with worm 73 is advantageously mounted in an eye 75 molded to the face of frame 3. As may be seen in FIG. 10, a stub shaft of worm gear 74 having a square shaped end 76, projects out so that a handcrank with a corresponding, square shaped profile can be attached to the end of worm gear 74. The end 76, may project, for instance, into a throughlike depression in the inside of the vehicle door panel without need to increase the flat structural height of the motor drive unit.

Worm 73 and worm gear 74 may be brought into driving connection against a spring pressure (not shown) when the manual operating mechanism is actuated. By interposing a flexible shaft, it is possible to put the handcrank coupling point in the most advantageous spot from an operating point of view without regard to a drive unit configuration which is most favorable from the aspect of assembly and production engineering.

As may be seen, particularly from a comparison of FIG. 7 with FIGS. 4 and 10, the rope pull hoist of the present invention provides minimal, like, structural thicknesses (structural dimensions) $a_1$ and $a_2$, respectively, for the entire drive system, which including rope drum and stroke travel limiting means, as well as coupling means for the manual operating mechanism. The structural thicknesses are no greater than the thickness a of the flat electric motor. In a practical embodiment satisfying all requirements of a simple rope pull hoist drive, this size need not exceed 40 mm. The rope pull hoist of the invention is therefore able to meet the need for a compact, easy-to-produce drive system for an electric motor-driven window raiser for use in the constantly shrinking space available inside a vehicle door.

What is claimed is:

1. In a rope pull hoist, useful for operating motor vehicle doors, windows, and sliding roofs, and driven by a permanent magnet motor having a flat housing, the motor having a shaft extending into a gear box and carrying a worm, a worm gear driven by the worm and coupled to a rope drum for engaging a closed rope loop, the improvement comprising:
    the motor comprising a rotor mounted in an axially oriented, magnetically nonconductive frame along with at least one permanent magnet;
    pole plates for the motor being in close contact with either side of the frame and serving as flat housing halves, the housing so formed having a given thickness;
    the worm wheel and the rope drum coupled to it being rotatably mounted on a shaft in the gear box; and
    the gear box having a thickness less than the given thickness of the electric motor housing.

2. In a motor driven pull hoist according to claim 1, the further improvement in which the magnetically nonconducting frame comprises plural integral support means for mounting components of the motor and of the gears.

3. An electric motor-driven rope pull hoist in accordance with claim 2 further comprising:
    a partition wall integrally molded to the frame for separating the gear box from the motor.

4. An electric motor-driven rope pull hoist in accordance with one of claims 1, 2 or 3, further comprising:
    the frame being a one-piece plastic injection molding.

5. An electric motor-driven rope pull hoist in accordance with claim 4 in which at least one integral support means for the motor comprises:

a half-open bearing cup integrally molded to the frame;
    a bearing on the motor shaft inserted in and axially fixed by the bearing cup; and
    a spring clip fastened to the frame across the opening of the bearing cup to retain the bearing therein and to fix the bearing against radial motion.

6. An electric motor-driven rope pull hoist in accordance with claim 4 in which at least one integral support means for the motor comprises:
    a half-open bearing cup integrally molded to the frame;
    a bearing on the motor shaft inserted in and axially fixed by the bearing cup; and
    a second half-open bearing cup screwed to the frame across the opening of the first-named cup to retain the bearing therein and to fix the bearing against radial motion.

7. An electric motor-driven rope pull hoist in accordance with claim 4 in which an integral support means for the motor not located adjacent to the worm comprises:
    a half-open bearing cup integrally molded to the frame;
    a calotte bearing seated in the bearing cup for absorbing radial forces;
    a spring clip fastened to the frame across the opening of the bearing cup to retain the bearing in the cup; and
    an axial thrust bearing coupled to the motor shaft and coupling thrust to the frame, the axial thrust bearing located between the calotte bearing and the worm.

8. An electric motor-driven rope pull hoist in accordance with claim 1 in which the motor has a single permanent magnet and further comprising:
    a space bounded on adjacent sides by the motor rotor and by the worm gear, the single permanent magnet being mounted in the space.

9. An electric motor-driven rope pull hoist in accordance with claim 7 in which the motor has a single permanent magnet and further comprising:
    a space bounded on adjacent sides by the motor rotor and by the worm gear, the single permanent magnet being mounted in the space.

10. An electric motor-driven rope pull hoist in accordance with claim 1, further comprising:
    means coupled between the worm wheel and a part of the gear box for limiting angular rotation of the worm wheel.

11. An electric motor-driven rope pull hoist in accordance with claim 10 in which the worm gear and the rope drum are supported in the gear box on a shaft and in which the means for limiting angular rotation is rotatably mounted on the shaft on the side of the worm wheel which is away from the rope drum.

12. An electric motor-driven rope pull hoist in accordance with claim 11 in which the worm wheel and the rope drum are coupled to each other by elastic means.

13. An electric motor-driven rope pull hoist in accordance with claim 12 in which the elastic means comprises buffers of at least one of rubber or a plastic.

14. An electric motor-driven rope pull hoist in accordance with any one of claims 1 or 10 and further comprising:
    fittings for fastening rope guiding tubes molded onto a part of the gear box.

15. An electric motor-driven rope pull hoist in accordance with any one of claims 1 or 10, further comprising:
   separate fittings, removably attached to the gear box, for fastening rope guiding tubes at different angles relative to the rope drum.

16. An electric motor driven rope pull hoist in accordance with claim 2 further comprising:
   fastening lugs made integral with the hoist in the region of the gear box for fastening and supporting the hoist on a motor vehicle part.

17. An electric motor-driven pull hoist in accordance with claim 16 in which the frame serving for mounting the gears comprises a cup-shaped part and the fastening lugs are molded to the cup-shaped part.

18. An electric motor-driven rope pull hoist in accordance with claim 16, and further comprising:
   a cover attached to and closing the gear box, the fastening lugs being molded thereto.

19. An electric motor-driven rope pull hoist in accordance with any one of the claims 16, 17, and 18 and further comprising:
   rubber buffers adapted to be inserted between the fastening lugs and the supporting motor vehicle part.

20. An electric motor-driven rope pull hoist in accordance with any one of claims 1, 2, 3, 8, 12, and 16 and further comprising:
   means for coupling a handcrank to one end of the motor rotor shaft.

21. An electric motor-driven rope pull hoist in accordance with claim 20 in which the end of the motor shaft away from the gear box extends out of the motor housing and further comprising:
   a worm coupled to said end and adapted to be brought into driving connection with a worm gear to which a hand crank can be coupled.

22. An electric motor-driven rope pull hoist in accordance with claim 21 and further comprising:
   an eye molded to a face of the magnetically conducting frame and the worm gear mounted in the eye.

* * * * *